United States Patent
Nagatsuka et al.

(10) Patent No.: US 7,937,186 B2
(45) Date of Patent: May 3, 2011

(54) DEVICE AND METHOD FOR AUTOMATICALLY SETTING INTERLOCK BETWEEN ROBOTS

(75) Inventors: Yoshiharu Nagatsuka, Yamanashi (JP); Toshiya Takeda, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 1181 days.

(21) Appl. No.: 11/635,028

(22) Filed: Dec. 7, 2006

(65) Prior Publication Data

US 2007/0150093 A1    Jun. 28, 2007

(30) Foreign Application Priority Data

Dec. 13, 2005 (JP) .................................. 2005-359001

(51) Int. Cl.
*B25J 19/00*   (2006.01)
*G05B 19/04*   (2006.01)
*G05B 19/19*   (2006.01)

(52) U.S. Cl. ............. 700/255; 700/253; 700/248; 901/6; 901/49; 318/568.13; 318/568.24

(58) Field of Classification Search ............. 318/568.12, 318/568.2, 568.21, 568.23, 568.13, 568.16, 318/568.17, 568.24; 700/245, 247, 248, 700/255, 262, 61–64, 264, 253; 901/6, 8, 901/49

See application file for complete search history.

(56) References Cited

U.S. PATENT DOCUMENTS

| | | | | |
|---|---|---|---|---|
| 4,888,707 A * | 12/1989 | Shimada | ........................ | 700/255 |
| 5,086,262 A * | 2/1992 | Hariki et al. | ............... | 318/568.1 |
| 5,227,707 A * | 7/1993 | Mitomi et al. | ............. | 318/568.1 |
| 6,330,495 B1 * | 12/2001 | Kaneko et al. | ................ | 700/264 |
| 7,321,808 B2 * | 1/2008 | Nagamatsu | ................... | 700/248 |
| 7,664,570 B2 * | 2/2010 | Suita et al. | .................. | 700/245 |
| 2005/0055134 A1 * | 3/2005 | Okuda et al. | ................... | 700/245 |
| 2005/0273200 A1 * | 12/2005 | Hietmann et al. | ........... | 700/248 |
| 2008/0114492 A1 * | 5/2008 | Miegel et al. | ................. | 700/248 |

FOREIGN PATENT DOCUMENTS

| | | |
|---|---|---|
| GB | 2 330 666 A | 4/1998 |
| JP | 7-36511 | 2/1995 |
| JP | 10-003308 | 1/1998 |
| JP | 10-264058 | 10/1998 |
| JP | 11/347984 | 12/1999 |
| JP | 2003-200368 | 7/2003 |
| JP | 2005-81445 | 3/2005 |

OTHER PUBLICATIONS

Chinese Office Action issued Oct. 17, 2008 issued in Chinese Application No. 2006101633647 (including a translation thereof).
Japanese Notice of Reasons for Rejection mailed Jan. 8, 2008 issued in JP Application No. 2005-359001 (including a partial translation thereof).
European Office Action dated Jul. 3, 2009 issued in European Application No. 06024620.4.

* cited by examiner

*Primary Examiner* — Thomas G Black
*Assistant Examiner* — Christine Behncke
(74) *Attorney, Agent, or Firm* — Drinker Biddle & Reath LLP

(57) ABSTRACT

A device and a method for automatically setting an interlock based on a suitable interference area obtained by executing an offline simulation in relation to a system including a plurality of robots. The device executes the simulation on the offline programming system based on a motion program so as to determine a moving path of the robots and a two-dimensional interference area between the robots. Next, the device calculates a first three-dimensional interference area by moving the two-dimensional area in the vertical direction and calculates an accurate second three-dimensional interference area within the first interference area, using three-dimensional models of the robots.

2 Claims, 5 Drawing Sheets

DEVICE AND METHOD FOR AUTOMATICALLY SETTING INTERLOCK BETWEEN ROBOTS

RELATED APPLICATIONS

The present application claims priority from Japanese Patent Application No. 2005-359001, filed on Dec. 13, 2005, the entire content of which is fully incorporated herein by reference.

BACKGROUND OF THE INVENTION

1. Field of the Invention

The present invention relates to a device and a method for automatically setting an interlock so as to avoid interference between robots.

2. Description of the Related Art

When a robot is operated in cooperation with external equipment, it is necessary to avoid interference between the devices if the operating areas overlap. For example, Japanese Unexamined Patent Publication No. 10-3308 discloses a method for avoiding interference between a robot and external equipment. In this method, in order to avoid interference between the robot and a press machine as the external equipment, an interference area is predetermined and a signal is sent to one of the robot and the press machine, such that one cannot enter the interference area when the other is located in the area.

Similarly, in relation to a plurality of robots, it is necessary to set interlock such that one or more robot cannot enter the interference area if paths of the robots interfere with each other. However, as the path of each robot is generally complicated, the moving area (or the interference area) of the robot cannot be easily determined, unlike the case of the above press machine. Therefore, conventionally, an operator visually estimates the interference area of the robot and sets interlock by editing a teaching program of the robot.

As described above, as the interference area is visually estimated, such work requires much skill. Accordingly, an operator can overlook the possibility of interference or, otherwise, can over-estimate the interference area. In the former case, collision between the robots may occur. In the latter case, the waiting time of one or more robots may be unnecessarily extended. Further, during a trial and error process for finding a most appropriate interference area, one robot may actually collide with another robot.

SUMMARY OF THE INVENTION

Accordingly, it is an object of the present invention to provide a device and a method for automatically setting an interlock, based on a suitable interference area obtained by executing an offline simulation in relation to a system including a plurality of robots.

To this end, according to one aspect of the present invention, there is provided a device for automatically setting an interlock between a plurality of robots, by editing a motion program of each robot, the device comprising: an interference area setting section for setting an interference area between the robots, using a simulation result based on the motion program of each robot; and a program editing section for inserting a motion command and a communication command before and after a command for moving each robot through the interference area of the motion program, the motion command being configured to direct the position and the orientation of each robot when the robot enters or leaves the interference area, and the communication command being configured to inform a robot of entering and leaving the interference area of the other robot.

The interference area setting section may have a first interference area calculating part, the first interference area calculating part being configured to calculate two-dimensional coordinates of a moving path of a farthest point of each robot based on the simulation result, a two-dimensional interference area based the two-dimensional coordinates of the moving path of each robot, and a first three-dimensional interference area formed by moving the two-dimensional interference area in the direction perpendicular to the two-dimensional interference area.

The interference area setting section may further have a second interference area calculating part, the second interference area calculating part being configured to calculate a three-dimensional transit area of the moving path of each robot in the first interference area, by using a three-dimensional model of each robot, and a second three-dimensional interference area by checking interference between each three-dimensional transit area in the first three-dimensional interference area.

According to another aspect of the present invention, there is provided a method for automatically setting an interlock between a plurality of robots, by editing a motion program of each robot, the method comprising the steps of: setting an interference area between the robots, using a simulation result based on the motion program of each robot; and inserting a motion command and a communication command before and after a command for moving a robot through the interference area of the motion program, the motion command being configured to direct the position and the orientation of the robot when the robot enters or leaves the interference area, and the communication command being configured to inform the other robots of entering and leaving the interference area of one robot.

The setting step may include a step of calculating two-dimensional coordinates of a moving path of a farthest point of each robot based on the simulation result, a two-dimensional interference area based the two-dimensional coordinates of the moving path of each robot, and a first three-dimensional interference area formed by moving the two-dimensional interference area in the direction perpendicular to the two-dimensional interference area.

The setting step may further include the step of calculating a three-dimensional transit area of the moving path of each robot in the first interference area, by using a three-dimensional model of each robot, and a second three-dimensional interference area by checking interference between each three-dimensional transit area in the first three-dimensional interference area.

BRIEF DESCRIPTION OF THE DRAWINGS

The above and other objects, features and advantages of the present invention will be made more apparent by the following description, of preferred embodiments thereof, with reference to the accompanying drawings, wherein.

DETAILED DESCRIPTIONS

Figure 5:
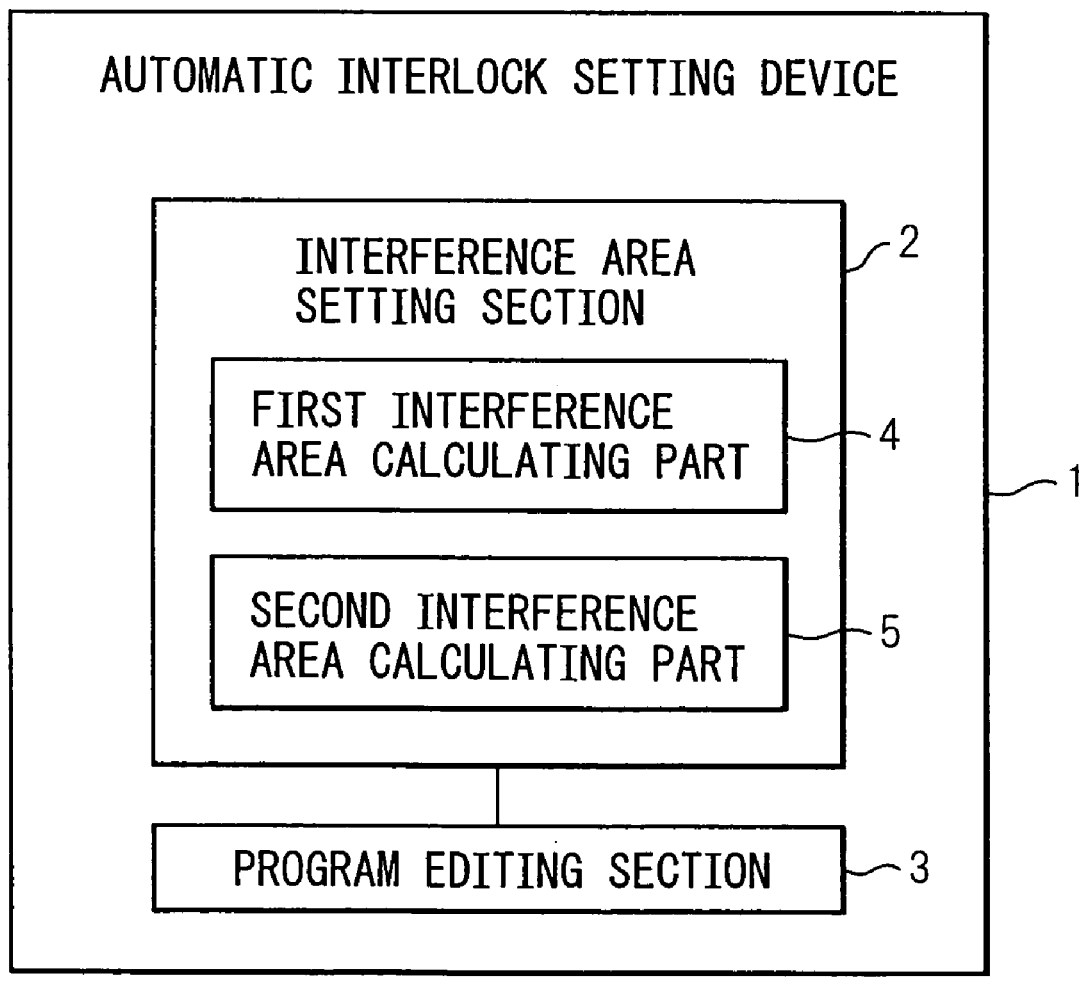
FIG. 5 is a block diagram showing the schematic constitution of the interlock setting device of the invention.

The present invention will be described below with reference to the drawings. FIG. 5 shows a preferred schematic constitution of an interlock setting device 1 of the invention. The interlock setting device 1 includes an interference area setting section 2 for setting an interference area between the robots, using a simulation result based on the motion program of each robot; and a program editing section 3 for inserting a motion command and a communication command before and after a command for moving a robot through the interference area of the motion program, the motion command being configured to direct the position and the orientation of the robot when the robot enters or leaves the interference area, and the communication command being configured to inform the other robots of entering and leaving the interference area of one robot. The interference area setting section 2 includes a first interference area calculating part 4 for determining a two-dimensional interference area and a first three-dimensional interference area as described below, and a second interference area calculating part 5 for determining a second three-dimensional interference area as described below. The actual interlock setting device may be included in a programming device for making a motion program and/or a teaching program for each robot, otherwise, may be arranged separately from the programming device.

Hereinafter, the interlock setting device, for avoiding interference between two robots, i.e., a robot 10 and a robot 20, will be explained. However, the same concept may be applied to a case of three or more robots.

Figure 1:
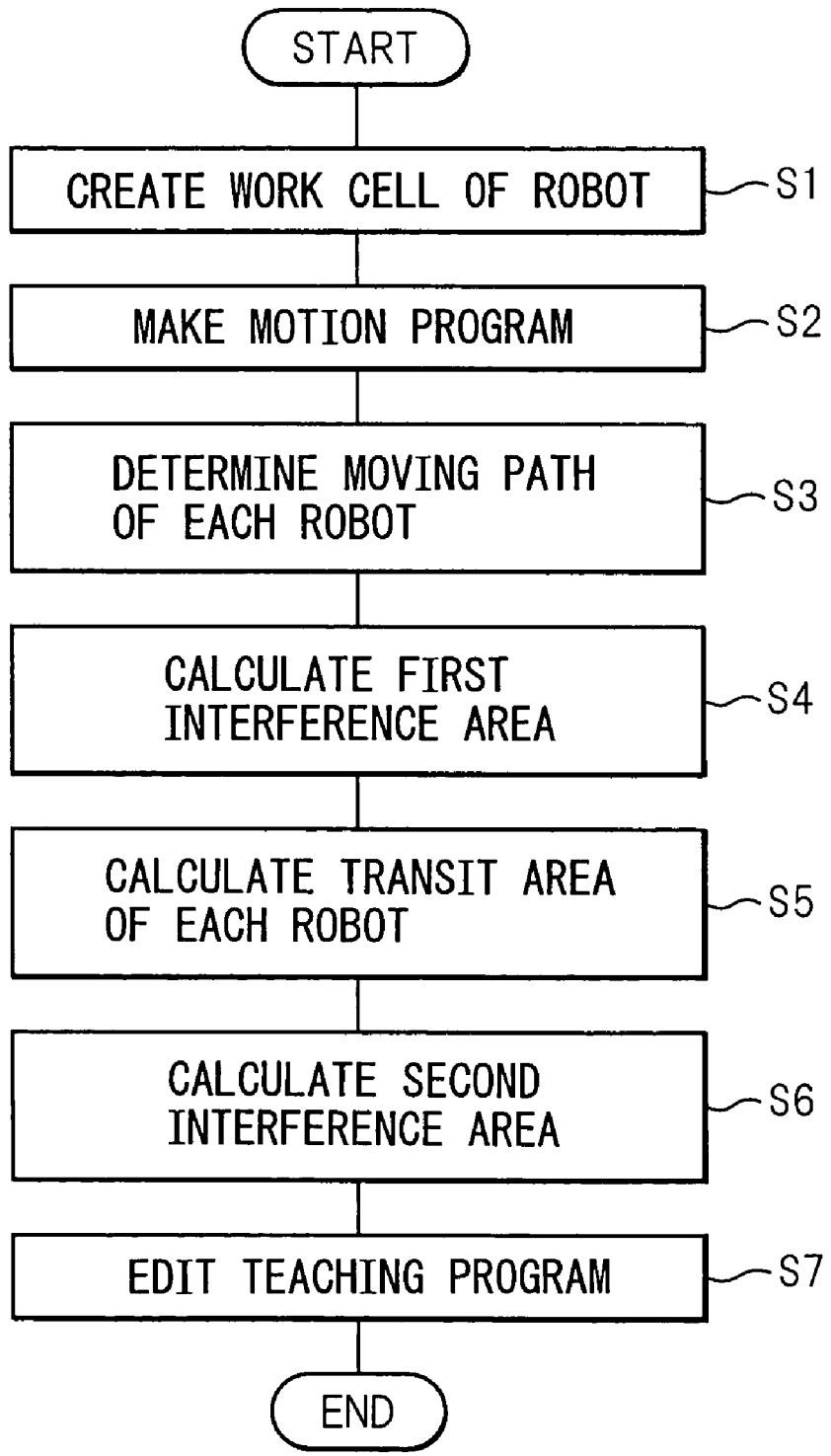
FIG. 1 shows a procedure of an interlock setting device according to the invention.
Figure 2:
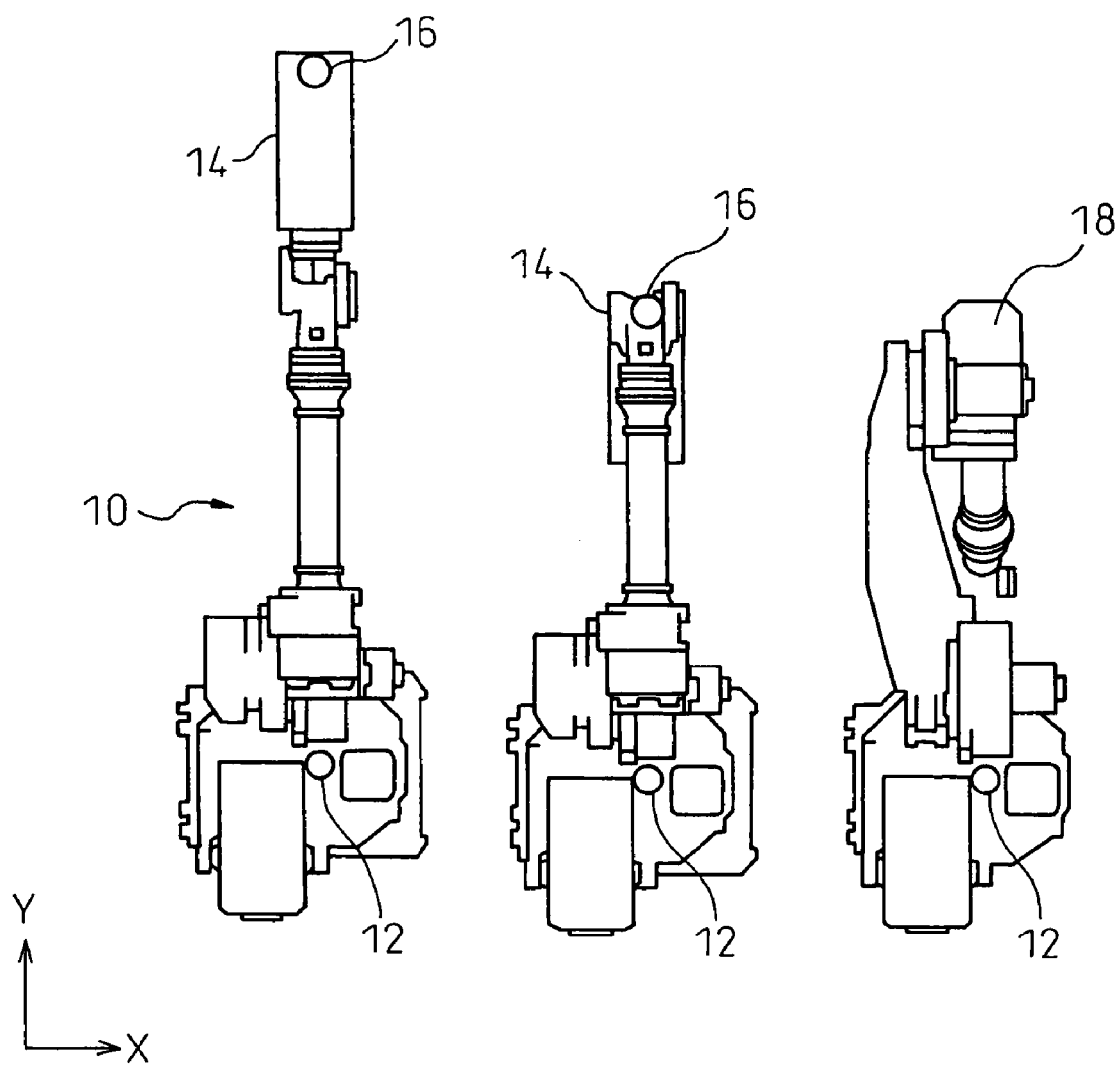
FIG. 2a shows the origin of a robot and a farthest point on a work tool.
FIG. 2b shows the robot in which the farthest point of FIG. 2a is moved by changing the orientation of the robot.
FIG. 2c shows the robot in which the farthest point on the work tool is moved to on a link of the robot by further changing the orientation of the robot.

FIG. 1 is a flowchart showing a procedure or a setting method executed by the interlock setting device of the invention. First, as shown in FIGS. 2a to 2c, a work cell, in which the robots 10 and 20 are arranged, is created (step S1 in FIG. 1). FIG. 2 shows the robot 10 only, as the robot 20 is similar to the robot 10. At this point, when the robot 10 presents a certain orientation, a point on the robot 10, which may be the farthest point from the origin 12 of the robot viewed in the two-dimensional coordinate, is set. In the robot as shown in FIGS. 2a to 2c, an end point 16 of a tool 14 or a point on a link 18 may be the farthest point. For example, the farthest point is the tool end point 16 in the case of FIGS. 2a and 2b, on the other hand, the farthest point is the link 18 in the case of FIG. 2c.

Next, a motion program for each robot is made (step S2 in FIG. 1). The motion program is made by the conventional method based on the operation required for each robot.

Figure 3:
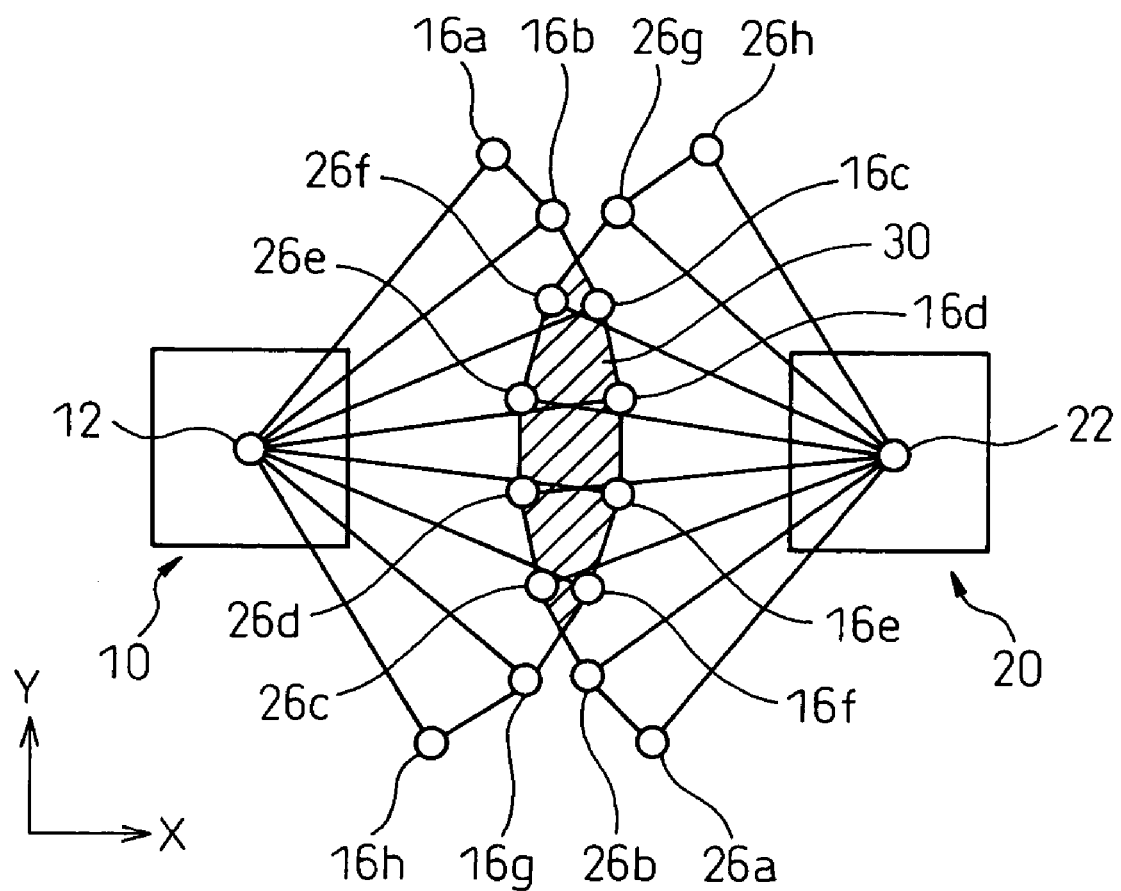
FIG. 3 is a diagram showing a two-dimensional interference area between two robots.

Then, based on the motion program made in step S2, a simulation is executed off-line on a programming system, so as to determine the moving path of each robot (step S3 in FIG. 1). FIG. 3 shows a result of this simulation. In FIG. 3, the robots 10 and 20 are schematically arranged on the same two-dimensional coordinate as that of FIGS. 2a to 2c. In other words, only the origins 12 and the farthest points 16a to 16h of the robot 10, and only the origins 22 and the farthest points 26a to 26h of the robot 20 are indicated in FIG. 3.

As shown in FIG. 3, by the simulation of the motion program, the farthest point of the robot 10 is moved from the point 16a to the point 16h, and the farthest point of the robot 20 is moved from the point 26a to the point 26h. At this point a plane of a two-dimensional area 30 (indicated by hatching lines in FIG. 3) is calculated and is referred to as an overlapping area between each area formed by the trajectory of the farthest points and the origin of each robot. Then, the two-dimensional area 30 is stored as a two-dimensional interference area (step S4 in FIG. 1).

Figure 4:
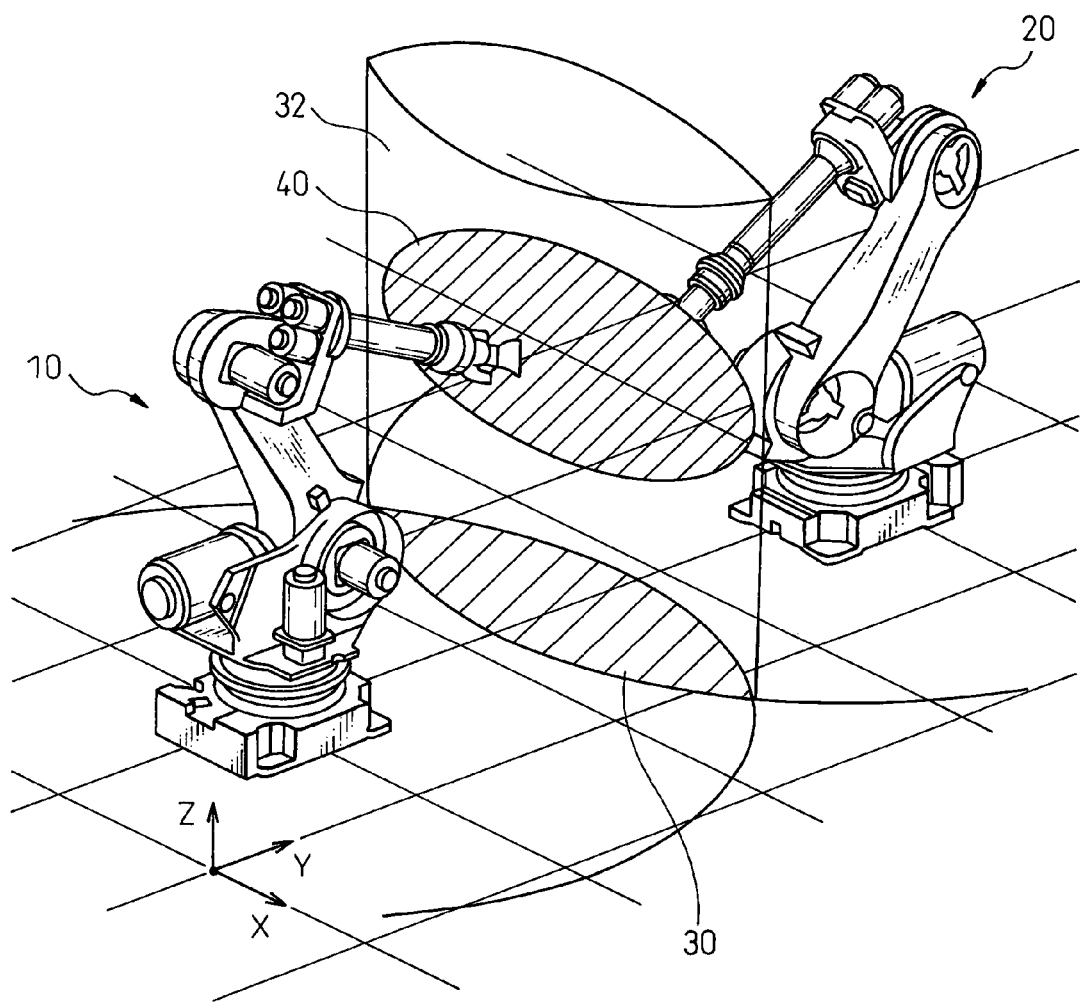
FIG. 4 is a diagram showing a three-dimensional interference area between the two robots.

Next, as shown in FIG. 4, the two-dimensional interference area 30 is moved vertically or in the Z-direction so as to create a first three-dimensional interference area 32. In other words, the first three-dimensional interference area 32 is a whole series of points whose X, Y-coordinates are within the plane 30 and the Z-coordinate is arbitrary. In this case, the first three-dimensional interference area 32 roughly includes an area in which interference may occur when each robot is operated according to the motion program. In other words, interference cannot occur in an area outside of the first three-dimensional interference area 32.

Then, in the first three-dimensional interference area 32 determined in step S4, a correct three-dimensional transit area of each robot is calculated when each robot is operated according to the motion program (step S5 in FIG. 1). The transit area of each robot may be calculated by using a predetermined three-dimensional CAD model of each robot as shown in FIGS. 2a to 2c and 4. Concretely, as the orientation of each robot at an arbitrary point in the first three-dimensional interference area 32 is already obtained by the motion simulation, the correct transit area of each robot may be calculated by, first, calculating a correct occupying area of each robot and, second, calculating the summation of the occupying area of each robot at all points in the first three-dimensional interference area 32.

Next, a product (or an overlapping area) of two transit areas of the robots 10 and 20 in the first three-dimensional interference area 32 is calculated and stored as a second three-dimensional interference area 40 (step S6 in FIG. 1). The second three-dimensional interference area 40, as shown in FIG. 4, is calculated as a three-dimensional area occupying a part of the first three-dimensional interference area 32. It can be said that the second three-dimensional interference area 40 is an accurate area in which interference may occur when each robot is operated according to the motion program. As described above, as the first three-dimensional interference area 32 roughly including the accurate area has already been calculated, the second three-dimensional interference area 40 may be calculated in a relatively short time.

In order to surely avoid interference between the robots 10 and 20, it is necessary that the whole or a part of each robot does not simultaneously enter the second three-dimensional interference area 40. Therefore, by informing one robot of the presence of at least a part of another robot in the second three-dimensional interference area 40, one robot may wait so as not to enter the second interference area 40. Due to this, a suitable interlock setting can be carried out.

There are some preferable ways to inform one robot (for example, the robot 20) of the presence of another robot (for example, the robot 10) in the second three-dimensional interference area 40. For example, the positions and the orientations of the robots 10 and 20, immediately or a predetermined time before entering the second interference area 40, or in front of the second interference area 40 by a predetermined distance, are calculated. Similarly, the positions and the orientations of the robots 10 and 20, immediately or a predetermined time after leaving the second interference area 40, or at the rear of the second interference area 40 by a predetermined distance, are calculated. Motion commands, for moving and orienting the robots to the calculated positions and orientations, are inserted into the teaching program. Further, a command, such as an I/O command, for inform the robot 20 of entering and leaving the second interference area 40 of the robot 10, is inserted into the teaching program, whereby the robot 20 may wait before the above motion command, from when the robot 10 enters the second interference area 40 and to when the robot 10 leaves the same. By means of such an edited teaching program (step S7 in FIG. 1), the waiting time of the robot 20 may be minimized, resulting in that a suitable interlock may be set.

In addition, it is also possible to execute step S7 in FIG. 1 based on only the first interference area 32 (i.e., steps S5 and S6 are omitted). In this case, as the more accurate second interference area 40 is not used, the waiting time of the robot may be somewhat overestimated and the tact time of each robot may be extended accordingly. However, this case does not need the three-dimensional CAD models of the robots and the calculation using the same, the calculating time may be shortened. In contrast, it is theoretically possible to directly calculate the accurate three-dimensional interference area without executing step S4. However, in this case, a huge memory area and a long calculation time are required, especially when a large number of robots are used.

According to a device and a method for automatically setting interlock between robots of the present invention, in an offline-programming system, an interlock may be automatically set based on an interference area between robots obtained by a simulation. This interference area may be determined by, first, calculating a rough first interference area above the two-dimensional plane and, second, calculating a second three-dimensional interference area within the first interference area. Therefore, an accurate interference area may be calculated in a short time.

Further, according to the invention, the collision between robots at an unexpected position may be avoided. Further, the unnecessarily long waiting time of the robot which may cause the long tact time may also be avoided. As the interlock may be automatically set, a stable interlock which does not depends on the skill of an operator may be achieved and the workload on the operator may be reduced.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A device for automatically setting an interlock between a plurality of robots, by editing a motion program of each robot, the device comprising:

an interference area setting section for setting an interference area between the robots, using a simulation result based on the motion program of each robot; and a program editing section for inserting a motion command and a communication command before and after a command for moving each robot through the interference area of the motion program, the motion command being configured to direct the position and the orientation of each robot when the robot enters or leaves the interference area, and the communication command being configured to inform a robot of entering and leaving the interference area of the other robot, wherein the interference area setting section comprises a first interference area calculating part, the first interference area calculating part being configured to calculate two-dimensional coordinates of a moving path of a farthest point of each robot based on the simulation result, a two-dimensional interference area based on the two-dimensional coordinates of the moving path of each robot, and a first three-dimensional interference area formed by moving the two-dimensional interference area in the direction perpendicular to the two-dimensional interference area, and wherein the interference area setting section comprises a second interference area calculating part, the second interference area calculating part being configured to calculate a three-dimensional transit area of the moving path of each robot according to the motion program in the first three-dimensional interference area, by using a three-dimensional model of each robot, and a second three-dimensional interference area by checking interference between each three-dimensional transit area in the first three-dimensional interference area.

2. A method for automatically setting an interlock between a plurality of robots, by editing a motion program of each robot, the method comprising the steps of:

setting an interference area between the robots, using a simulation result based on the motion program of each robot; and inserting a motion command and a communication command before and after a command for moving a robot through the interference area of the motion program, the motion command being configured to direct the position and the orientation of the robot when the robot enters or leaves the interference area, and the communication command being configured to inform the other robots of entering and leaving the interference area of one robot, wherein the setting step comprises a step of calculating two-dimensional coordinates of a moving path of a farthest point of each robot based on the simulation result, a two-dimensional interference area based on two-dimensional coordinates of the moving path of each robot, and a first three-dimensional interference area formed by moving the two-dimensional interference area in the direction perpendicular to the two-dimensional interference area, and wherein the setting step comprises a step of calculating a three-dimensional transit area of the moving path of each robot according to the motion program in the first three-dimensional interference area, by using a three-dimensional model of each robot, and a second three-dimensional interference area by checking interference between each three-dimensional transit area in the first three-dimensional interference area.

\* \* \* \* \*